United States Patent [19]

Kertzman

[11] 4,249,085
[45] Feb. 3, 1981

[54] TIDE OPERATED POWER GENERATING APPARATUS

[76] Inventor: Harvey Z. Kertzman, 806 W. Roxbury Pkwy., Brookline, Mass. 02167

[21] Appl. No.: 57,604

[22] Filed: Jul. 16, 1979

[51] Int. Cl.³ .............................................. F03B 13/12
[52] U.S. Cl. ...................................... 290/53; 60/495; 60/497; 417/335
[58] Field of Search ...................... 290/42, 53; 60/495; 415/5, 7; 417/330

[56] References Cited

U.S. PATENT DOCUMENTS

| 3,567,953 | 3/1971 | Lord | 290/53 |
| 3,668,412 | 6/1972 | Vrana et al. | 290/53 |
| 3,857,242 | 12/1974 | Gilmore | 60/495 |
| 3,959,663 | 5/1976 | Rusby | 290/53 |

Primary Examiner—Gene Z. Rubinson
Assistant Examiner—Don Rebsch
Attorney, Agent, or Firm—John M. Brandt

[57] ABSTRACT

An improved tide operated power generating apparatus is disclosed in which a hollow float, rising and falling with the ocean tide, transmits energy to a power generator. The improvement comprises means for filling the float with water during the incoming tide to provide a substantial increase in the float dead weight during the outgoing tide. Means are further provided to then empty the float before the outgoing tide whereby the float becomes free to rise again on the next incoming tide.

5 Claims, 1 Drawing Figure

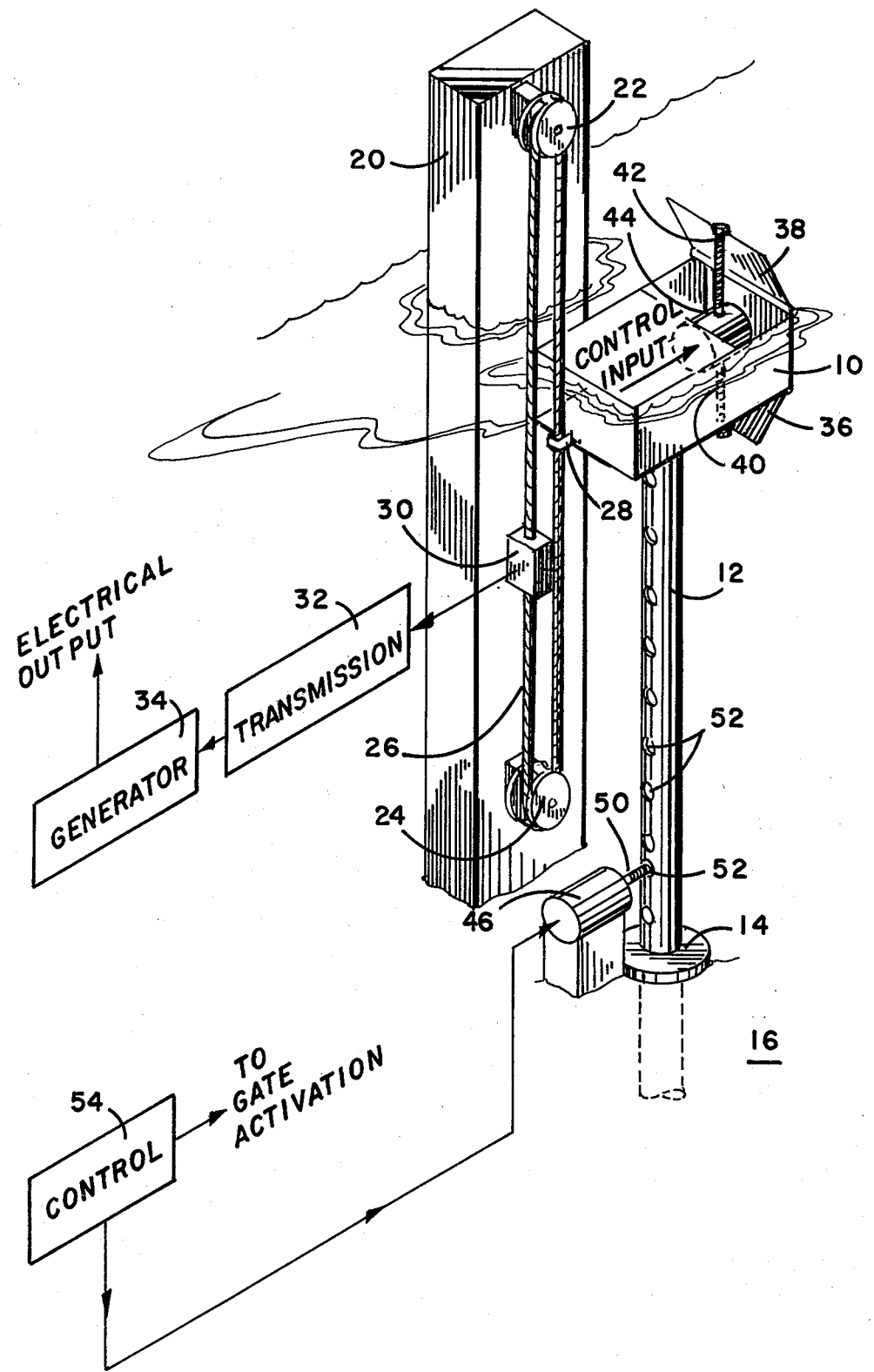

TIDE OPERATED POWER GENERATING APPARATUS

BACKGROUND OF THE INVENTION

1. Field of the Invention:

The invention resides in the field of power plants having a buoyant working member motivated by the vertical rise and fall of a surface of a body of fluid and more particularly relates to ocean tide operated devices.

2. Description of the Prior Art:

A number of flotation based prime mover devices including a variety utilizing the energy of the rise and fall of the ocean tides exist in the prior art.

For example, U.S. Pat. No. 3,567,953, Lord, discloses a tide actuated system in which an entire electric generator is mounted on a float vertically moveable with respect to a stationary cable. The up and down movement of the float and generator on the tide with respect to the cable drives the generator. U.S. Pat. No. 3,668,412, Vrana et al., describes a technique in which a float is constrained in a chamber and then released at the height of the tide and additionally the concept of a plurality of such floats and chambers which may be operated on a staggered basis.

Further, U.S. Pat. No. 3,857,242, Gilmore, discloses a non-tidal motor system in which closed containers fall by weight of gravity in air and float upward when transferred to a liquid filled chamber. Similarly, U.S. Pat. No. 3,934,964, Diamond, describes a non-tidal system in which the floation, i.e. displacement volume, of a plurality of cylinders wholly immersed in a body of liquid is controlled by the insertion and withdrawal of a piston in each.

An additional tidal system in which a float is used to increase the potential energy of a pendulum which is then released to generate power is discussed in U.S. Pat. No. 3,011,062, Goldsmith.

All of the prior art tidal systems known to applicant utilize a closed float which falls of its own weight by gravity on the outgoing tide to drive a power generator. Thus in prior art devices, the amount of power which can be produced during the outgoing tide cycle is limited to the potential energy stored in an empty float raised by the incoming tide. In the manner of applicant's invention, this potential energy may be greatly increased by flooding the float with water at a chosen time during the incoming tide. By this method, the weight of a float volume of water is added to the potential energy of the system and becomes available to operate a substantially larger power generator than would otherwise be possible.

SUMMMARY OF THE INVENTION

The invention may be summarized as an improved tide operated power generating apparatus employing a hollow float, rising and falling with the tide, to drive a generator. The improvement comprises means for filling the float with water during the incoming tide, preferably at the peak, to increase the weight of the float driving the generator by gravity during the outgoing tide. Means for emptying the float are provided to return the float to a buoyant condition once the filled float has completed its downward travel. Downward float movement may be constrained in order to optimize the output of the generator, particularly an electrical generator. The constraint may be used to control the amount of the output by slowing the rate of descent of the filled float, or to control the timing of the output to supply power as needed, or both.

A variety of means may be used to control the filling and emptying of the float. For example, a clock set to the period of the tide may be employed to activate a solenoid gate. A remote control radio frequency signal may similarly be used. Mechanical activation by interaction of gate switches with upper and lower structural members is possible as well as hand operation where access to the float may be had.

The merit and features of the invention will become more evident from the description of the drawings and the preferred embodiment which follow.

DESCRIPTION OF THE DRAWING

The FIGURE is a perspective view of apparatus constituting the preferred embodiment of the invention.

DESCRIPTION OF THE PREFERRED EMBODIMENT

Referring to the FIGURE, there is shown apparatus suitable for practicing the invention comprising a float 10 secured to float shaft 12 slideably mounted in sleeve 14 embedded in the ocean floor 16. Pylon 20 has rotatable pulleys 22 and 24 mounted thereon between which is strung cable 26. The cable is attached to float 10 by clamp 28 and passes through rotational coupling 30 mounted on the pylon. The coupling is linked to transmission 32 and the transmission to generator 34 by means shown schematically. As the cable is moved through the rotational coupling by the up and down motion of the float, the generator is turned and electrical power generated as is known and described in the referenced prior art.

Means for filling and emptying the float are provided by, for example, hinged water tight gates or ports 36 and 38 which may be activated, i.e., opened and closed, by screw shafts 40 and 42 operated by reversible motor 44. In order to fill the float, the gates are opened at a point on the incoming tide, preferably at high tide as shown. Gate 38 allows air in the float to escape, while gate 36 admits water. The float sinks below water level while filling completely, then the gates are closed and the water held in the float.

Means are further provided to constrain the downward movement of the float so that, if desired, the entire weight of the water filled float may be used to drive the generator after the tide has receded. This may take the form of motor 46 mounted on pedestal 48 arranged to propel shaft 50 into any of recepticles 52 in float shaft 12. Shaft 50 is withdrawn at such time as is appropriate according to the height of the tide and requirements for power.

Before the water filled float has descended to low tide water level, motor 46 again constrains downward movement and, the gates are again opened and closed, allowing the water to escape and the float to return to an empty condition. Control 54, manual or automatic, of a form described above, activates motor 44 and motor 46 as shown schematically.

As wil be obvious, a variety of mechanical and electrical combinations of apparatus may be used to accomplish the purpose of the invention. It is further intended that mechanical as well as electrical power may be generated by the assembly herein described. Accordingly, the scope of the invention is described by the following claims.

What is claimed is:

1. Tide operated power generating apparatus comprising in combination:
   a. a hollow float;
   b. means for constraining the lateral movement of said float whereby said float will rise vertically with the incoming tide and fall vertically with the outgoing tide;
   c. filling means for admitting water to the interior of said float during the incoming tide;
   d. emptying means for releasing said water from the interior of said float during the outgoing tide; and
   e. means for connecting said float to a power generating device whereby said device is operated by the rise of said empty float during the incoming tide and the fall of said filled float during the outgoing tide.

2. The apparatus of claim 1 further including means for actuating said filling means at the peak of said incoming tide.

3. The apparatus of claim 1 further including means for actuating said emptying means before the extremis of said outgoing tide.

4. The apparatus of claim 1 further including means for constraining the vertical movement of said float.

5. The apparatus of claim 1 wherein said power generating device comprises an electric generator.

* * * * *